US012282478B2

(12) United States Patent
Schlosser et al.

(10) Patent No.: US 12,282,478 B2
(45) Date of Patent: Apr. 22, 2025

(54) ITERATIVE MULTI-ATTRIBUTE INDEX SELECTION FOR LARGE DATABASE SYSTEMS

(71) Applicant: Hasso-Plattner-Institut für Digital Engineering gGmbH, Potsdam (DE)

(72) Inventors: Rainer Schlosser, Berlin (DE); Jan Kossmann, Berlin (DE); Martin Boissier, Berlin (DE); Matthias Uflacker, Berlin (DE); Hasso Plattner, Schriesheim (DE)

(73) Assignee: Hasso-Plattner-Institut für Digital Engineering gGmbH, Potsdam (DE)

( * ) Notice: Subject to any disclaimer, the term of this patent is extended or adjusted under 35 U.S.C. 154(b) by 181 days.

(21) Appl. No.: 16/838,830

(22) Filed: Apr. 2, 2020

(65) Prior Publication Data
US 2020/0320070 A1    Oct. 8, 2020

(30) Foreign Application Priority Data

Apr. 3, 2019  (EP) .................................. 19167157

(51) Int. Cl.
*G06F 16/00*   (2019.01)
*G06F 9/50*    (2006.01)
(Continued)

(52) U.S. Cl.
CPC ........ *G06F 16/2453* (2019.01); *G06F 9/5016* (2013.01); *G06F 9/5027* (2013.01);
(Continued)

(58) Field of Classification Search
CPC .... G06F 16/2453; G06F 16/211; G06F 16/22; G06F 16/284; G06F 16/24549;
(Continued)

(56) References Cited

U.S. PATENT DOCUMENTS 5,875,445 A * 2/1999 Antonshenkov .... G06F 16/2246
                                                         707/999.102
5,913,206 A    6/1999 Chaudhuri et al.
(Continued)

FOREIGN PATENT DOCUMENTS

CN    107820613 A    3/2018
CN    10733781 A     11/2018
(Continued)

OTHER PUBLICATIONS

Michael Gibas et al., "Online Index Recommendations for High-Dimensional Databases Using Query workloads", IEEE Transactions on Knowledge and Data Engineering, vol. 20, Issue: 2, Feb. 2008, pp. 246-260.*
(Continued)

*Primary Examiner* — Srirama Channavajjala
(74) *Attorney, Agent, or Firm* — Fountainhead Law Group, PC (57) ABSTRACT

The inventors have implemented in a columnar in-memory database and studied access patterns of a large production enterprise system. To obtain accurate cost estimates for a configuration, the inventors have used the what-if capabilities of modern query optimizers. What-if calls, however, are the major bottleneck for most index selection approaches. Hence, a major constraint is to limit the number of what-if optimizer calls. And even though the inventive approach does not limit the index candidate set, it decreases the number of what-if calls because in each iteration step the number of possible (index) extensions is comparably small which results in a limited number of what-if calls.

15 Claims, 6 Drawing Sheets

(51) Int. Cl.
| | |
|---|---|
| *G06F 11/30* | (2006.01) |
| *G06F 16/21* | (2019.01) |
| *G06F 16/22* | (2019.01) |
| *G06F 16/242* | (2019.01) |
| *G06F 16/2453* | (2019.01) |
| *G06F 16/2455* | (2019.01) |
| *G06F 16/28* | (2019.01) |

(52) U.S. Cl.
CPC ........ *G06F 11/3034* (2013.01); *G06F 16/211* (2019.01); *G06F 16/22* (2019.01); *G06F 16/2282* (2019.01); *G06F 16/2425* (2019.01); *G06F 16/24542* (2019.01); *G06F 16/24549* (2019.01); *G06F 16/2455* (2019.01); *G06F 16/24565* (2019.01); *G06F 16/284* (2019.01)

(58) Field of Classification Search
CPC ........... G06F 16/24542; G06F 16/2455; G06F 16/2282; G06F 16/2425; G06F 16/25455; G06F 16/24565
See application file for complete search history.

(56) References Cited

U.S. PATENT DOCUMENTS

| | | | |
|---|---|---|---|
| 5,926,913 A | 7/1999 | Chaudhuri et al. | |
| 6,317,738 B1* | 11/2001 | Lohman | G06F 16/24539 707/999.005 |
| 6,581,058 B1* | 6/2003 | Fayyad | G06F 16/30 707/E17.058 |
| 6,631,366 B1* | 10/2003 | Nagavamsi | G06F 16/2455 707/999.102 |
| 6,865,567 B1* | 3/2005 | Oommen | G06F 16/24542 |
| 7,886,039 B2* | 2/2011 | Popescu | H04L 12/185 709/224 |
| 8,260,803 B2* | 9/2012 | Hsu | G06F 16/24532 707/769 |
| 9,009,124 B2 | 4/2015 | Kimura et al. | |
| 2002/0049747 A1* | 4/2002 | Inohara | G06F 16/256 |
| 2003/0088579 A1* | 5/2003 | Brown | G06F 16/284 |
| 2004/0002957 A1* | 1/2004 | Chaudhuri | G06F 16/284 |
| 2004/0260675 A1* | 12/2004 | Bruno | G06F 16/24545 |
| 2005/0187917 A1* | 8/2005 | Lawande | G06F 16/24549 |
| 2006/0149695 A1* | 7/2006 | Bossman | G06F 16/221 706/48 |
| 2007/0078829 A1* | 4/2007 | Stern | G06F 16/8373 |
| 2007/0083502 A1* | 4/2007 | Ramakrishnan | G06F 16/2453 |
| 2013/0086038 A1 | 4/2013 | Perry | |
| 2013/0263117 A1* | 10/2013 | Konik | G06F 9/45558 718/1 |

FOREIGN PATENT DOCUMENTS

| | | | |
|---|---|---|---|
| EP | 1065606 A2 * | 1/2001 | |
| WO | WO2004053633 A2 * | 6/2004 | |

OTHER PUBLICATIONS

S. Choenni et al., "Index selection in relational databases", Proceedings of ICCI'93: 5th International Conference on Computing and Information, May 1993, pp. 491-496.*
Michael Gibas et al., "online index recommendations for high-dimensional databases using query workloads" IEEE transactions on knowledge and data engineering vol. 20,No. 2, Feb. 2008 pp. 246-260.*
M. S. Kester, M. Athanassoulis, and S. Idreos, "Access Path Selection in Main-Memory Optimized Data Systems: Should I Scan or Should I Probe?" in Proc. SIGMOD, 2017, pp. 715-730.
M. Faust et al., "Footprint Reduction and Uniqueness Enforcement with Hash Indices in SAP HANA," in Proc. DEXA, Part II, ser. Lecture Notes in Computer Science, vol. 9828, 2016, pp. 137-151.
H. Zhang, D. G. Andersen, A. Pavlo, M. Kaminsky, L. Ma, and R. Shen, "Reducing the Storage Overhead of Main-Memory OLTP Databases with Hybrid Indexes," in Proc. SIGMOD, 2016, pp. 1567-1581.
S. Chaudhuri, M. Datar, and V. R. Narasayya, "Index Selection for Databases: A hardness Study and a Principled Heuristic Solution," IEEE Trans. Knowl. Data Eng., vol. 16, No. 11, pp. 1313-1323, 2004.
M. Boissier et al., "Hybrid Data Layouts for Tiered HTAP Databases with Preto-Optimal Data Placements," in Proc. CDE, 2018, pp. 209-220.
S. Chaudhuri and G. Weikum, "Self-Management Technology in Databases," in Encyclopedia of Database Systems, 2009, pp. 2550-2555.
K. Schnaitter and N. Polyzotis, "Semi-Automatic Index Tuning: Keeping DBAs in the Loop," PVLDB, vol. 5, No. 5, pp. 478-489, 2012.
G. Piatetsky-Shapiro, "The Optimal Selection of Secondary Indices is NP-Complete," SIGMOD Record, vol. 13, No. 2, pp. 72-75, 1983.
G. Valentin, M. Zuliani, D. C. Zilio, G. M. Lohman, and A. Skelley, "DB2 Advisor: An Optimizer Smart Enough to Recommend its Own Indexes," in Proc. ICDE, 2000, pp. 101-110.
D. C. Zilio, J. Rao, S. Lightstone, G. M. Lohman, A. J. Storm, C. Garcia-Arellano, and S. Fadden, "DB2 Design Advisor: Integrated Automatic Physical Database Design," in Proc. VLDB, 2004, pp. 1087-1097.
H. Kimura, V. R. Narasayya, and M. Syamala, "Compression Aware Physical Database Design," PVLDB, vol. 4, No. 10, pp. 657-668, 2011.
K. Schnaitter, N. Polyzotis, and L. Getoor, "Index Interactions in Physical Design Tuning: Modeling, Analysis, and Applications," PVLDB, vol. 2, No. 1, pp. 1234-1245, 2009.
S. Chaudhuri and V. R. Narasayya, "An Efficient Cost-Driven Index Selection Tool for Microsoft SQL Server," in Proc. VLDB, 1997, pp. 146-155.
D. Dash et al., "CoPhy: A Scalable, Portable, and Interactive Index Advisor for Large Workloads," PVLDB, vol. 4, No. 6, pp. 362-372, 2011.
S. Papadomanolakis and A. Ailamaki, "An Integer Linear Programming Approach to Database Design," in ICDE Workshops, 2007, pp. 442-449.
S. Papadomanolakis, D. Dash, and A. Ailamaki, "Efficient Use of the Query Optimizer for Automated Database Design," in Proc. VLDB, 2007, pp. 1093-1104.
N. Bruno and S. Chaudhuri, "To Tune or Not to Tune? A Lightweight Physical Design Alerter," in Proc. VLDB, 2006, pp. 499-510.
M. Boissier et al., "Analyzing Data Relevance and Access Patterns of Live Production Database Systems," in Proc. CIKM, 2016, pp. 2473-2475.
W. Wu, Y. Chi, S. Zhu, J. Tatemura, H. Hacigumus, and J. F. Naughton, "Predicting Query Execution Time: Are Optimizer Cost Models Really Unusable?" in Proc. ICDE, 2013, pp. 1081-1092.
B. Falkowski, "Comments on an Optimal Set of Indices for a Relational Database," IEEE Transactions on Software Engineering, vol. 18, No. 2, pp. 168-171, 1992.
M. Y. L. Ip et al., "On the Selection of an Optimal Set of Indexes," IEEE Transactions on Software Engineering, vol. 9, No. 2, pp. 135-143, 1983.
G. B. Mathews, "On the Partition of Numbers," Proceedings of the London Mathematical Society, vol. s1-28, No. 1, pp. 486-490, 1896.
S. Chaudhuri and V. R. Narasayya, "AutoAdmin 'What-if' Index Analysis Utility," in Proc. SIGMOD, 1998, pp. 367-378.
S. Idreos, S. Manegold, H. A. Kuno, and G. Graefe, "Merging What's Cracked, Cracking What's Merged: Adaptive Indexing in Main-Memory Column-Stores," PVLDB, vol. 4, No. 9, pp. 585-597, 2011.
G. Graefe and H. A. Kuno, "Self-Selecting, Self-Tuning, Incrementally Optimized Indexes," in Proc. EDBT, 2010, pp. 371-381.
S. Idreos, M. L. Kersten, and S. Manegold, "Database Cracking," in Proc. CIDR, 2007, pp. 68-78.

(56) References Cited

OTHER PUBLICATIONS

F. M. Schuhknecht, A. Jindal, and J. Dittrich, "The Uncracked Pieces in Database Cracking," PVLDB, vol. 7, No. 2, pp. 97-108, 2013.

A. Caprara, M. Fischetti, and D. Maio, "Exact and Approximate Algorithms for the Index Selection Problem in Physical Database Design," IEEE Trans. Knowl. Data Eng., vol. 7, No. 6, pp. 955-967, 1995.

M. R. Garey and D. S. Johnson, "Computers and Intractability: A Guide to the Theory of NP-Completeness". W. H. Freeman, 1979.

S. Chaudhuri, A. K. Gupta, and V. R. Narasayya, "Compressing SQL Workloads," in Proc. SIGMOD, 2002, pp. 488-1499.

M. Dreseler et al., "Hyrise Re-Engineered: An Extensible Database System for Research in Relational In-Memory Data Management," in Proc. EDBT, 2019.

J. Kossmann and R. Schlosser, "A Framework for Self-Managing Database Systems," in Proc. ICDE Workshops, 2019.

D. Abadi, P. A. Boncz, S. Harizopoulos, S. Idreos, and S. Madden, "The Design and Implementation of Modern Column-Oriented Database Systems," Foundations and Trends in Databases, vol. 5, No. 3, pp. 197-280, 2012.

T. Kersten et al., "Everything You Always Wanted to Know About Compiled and Vectorized Queries but Were Arfaid to Ask," PVLDB, vol. 11, No. 13, pp. 2209-2222, 2018.

Rainer Schosser et al., "Efficient Scalable Multi-Attribute Index Selection Using Recursive Strategies", 2019 IEEE 35th International Conference on Data Engineering (ICDE), Apr. 8, 2019, pp. 1238-1249.

Extended European Search Report, EP19167157, dated Aug. 28, 2019, 10 pages.

Related Chinese Patent Application No. 202010260083.3; First Office Action issued on Jun. 28, 2024. English translation included; 13 pages.

\* cited by examiner

ITERATIVE MULTI-ATTRIBUTE INDEX SELECTION FOR LARGE DATABASE SYSTEMS

CROSS-REFERENCE TO RELATED APPLICATIONS

This disclosure claims priority to European Application No. EP 19 167 157.7 filed Apr. 3, 2019 for "Iterative Multi-Attribute Index Selection for Large Database Systems", which is incorporated herein by reference.

FIELD

This disclosure relates to database systems, in particular, to index selection for a database system.

BACKGROUND

Large database instances handling highly concurrent workloads require secondary indexes to avoid sequential scans, save memory bandwidth, and thereby achieve acceptable latencies and throughput.

Indexes trade increased performance for additional memory, typically a scarce resource in database systems. This emphasizes the need for mechanisms to efficiently balance memory consumption and performance gain.

In many existing systems, indexes are usually selected by Database Administrators (DBAs) who have to rely on their intuition and index advisor tools that often rely on heuristics.

Index selection (also referred to as index tuning) belongs to the class of NP-hard problems. Finding the best selection of indexes out of a large set of potential indexes is highly challenging as the presence of index elements mutually, which is called Index Interaction (herein referred to as "IIA"), affects their impact and the overall performance.

Especially large real-world problem instances exhibit characteristics that most existing selection approaches cannot handle:
(i) thousands of attributes to consider,
(ii) workloads consisting of many thousand query templates,
(iii) memory budget constraints, and
(iv) balancing reconfiguration costs with performance gains including considerations regarding IIA.

An array of publications (e.g., [Falkowski 1992; Ip et al. 1983]) reduces the Index Selection Problem (herein referred to as "ISP") to the Knapsack Problem (herein referred to as "KP") [Mathews 1896]. Both problems share similarities and are to a certain extent comparable. However, IIA (cf. [Schnaitter et al. 2009]) renders the reduction of ISP to KP an oversimplification of the problem.

Valentin et al. present the index selection approach of IBM DB2 [Valentin et al. 2000] which greedily selects indexes until the given budget is exceeded. The authors propose to evaluate indexes by their ratio of runtime improvement vs. size consumption. To account for index interactions and maintenance costs, the determined configuration is randomly shuffled several times in search for potentially better configurations.

Chaudhuri and Narasayya presented the optimizer-based index selection tool for Microsoft SQL Server [Chaudhuri and Narasayya 1997, 1998]. They explained several techniques to reduce the complexity of the ISP. For example, to avoid considering every admissible index, they determine a set of index candidates as input for the actual index selection process. These candidates are chosen as follows: Only indexes which are the best index for at least a single query are considered as index candidates, potentially resulting in wasted potential. Moreover, their solution, cf. [Chaudhuri and Narasayya 1997, 1998], takes a fixed number of indexes as constraint and stop criterion. Instead, as indexes differ in size depending on the underlying data, their size can be seen as a more reasonable constraint and consider a fixed memory budget.

A more recent version of Microsoft SQL Server's index advisor also incorporates compressed indexes [Kimura et al. 2011]. Here, potential index candidates are first filtered for being efficient (i.e., are not dominated by others). Then, Kimura et al. propose a heuristic that—in contrast to the DB2 advisor—greedily selects indexes with the largest expected runtime improvement. Only after the budget is exceeded, index costs are considered when the advisor tries to "recover" from the budget violation and iteratively replaces indexes with more space-efficient alternatives.

The work of Idreos et al. [Idreos et al. 2011] focuses on index selection for column stores. They introduced adaptive indexing, where the tuning of indexes is not a separate task but part of the query processing. The two techniques adaptive merging [Graefe and Kuno 2010] and database cracking [Idreos et al. 2007] either need a large number of processed queries to be fully functional or have high initial costs for the first queries compared to non-index scans.

The idea to formulate the ISP as an optimization problem is not new [Caprara et al. 1995; Dash et al. 2011; Papadomanolakis et al. 2007b]. These works consider binary integer problems as well as associated continuous relaxations. As integer optimization problems are NP-complete [Garey and Johnson 1979], heuristics are usually used. Caprara et al. [Caprara et al. 1995] use branch-and-bound algorithms to approximate solutions of their linear integer problem. Their model assumes that for each query at most one index is used which is a strong simplification. The benefit of an index for one query is not affected by other index decisions. Thereby, index interaction is often not considered which leads to suboptimal index configurations.

Dash et al. [Dash et al. 2011] presented with CoPhy the current state of the art solution for index selection. The authors claim to solve larger problem instances with well-known techniques from linear optimization efficiently. Their technique also relies on what-if optimizer calls to feed the input for their linear programming optimization.

An object of the present disclosure is to provide an improved index selection apparatus, index selection method, and index selection computer program product.

SUMMARY

This object is solved by the method according to claim 1, the computer system according to claim 9 and the computer program according to claim 10.

The claims take the inner workings of the database computer system into account and provide a further technical effect.

The inventors have implemented in a columnar in-memory database and studied access patterns of a large production enterprise system. To obtain accurate cost estimates for a configuration, the inventors have used the what-if capabilities of modern query optimizers, similar to the inventive approach [Chaudhuri and Narasayya 1997; Dash et al. 2011; Papadomanolakis et al. 2007b]. What-if calls, however, are the major bottleneck for most index selection approaches (cf. [Papadomanolakis et al. 2007a]). Hence, a major constraint is to limit the number of what-if optimizer calls. And even though the inventive approach does not limit the index candidate set, it decreases the number of what-if calls because in each iteration step the number of possible (index) extensions is comparably small which results in a limited number of what-if calls.

The inventors have evaluated the inventive concept in a real-world enterprise system. They have extracted the largest 500 tables (by memory consumption) from the database system including the queries accessing these tables. These 500 tables consist of 4 204 relevant attributes. The tables had between 350 000 and 1.5 billion rows. 55 758 distinct queries (with Q=2 271 query templates) were executed and more than 50 million query executions took place during the recorded period. The workload can be characterized as mostly transactional with a majority of point-access queries but also contains few analytical queries (more information about a comparable system can be found in [Boissier et al. 2016]).

Figure 1:
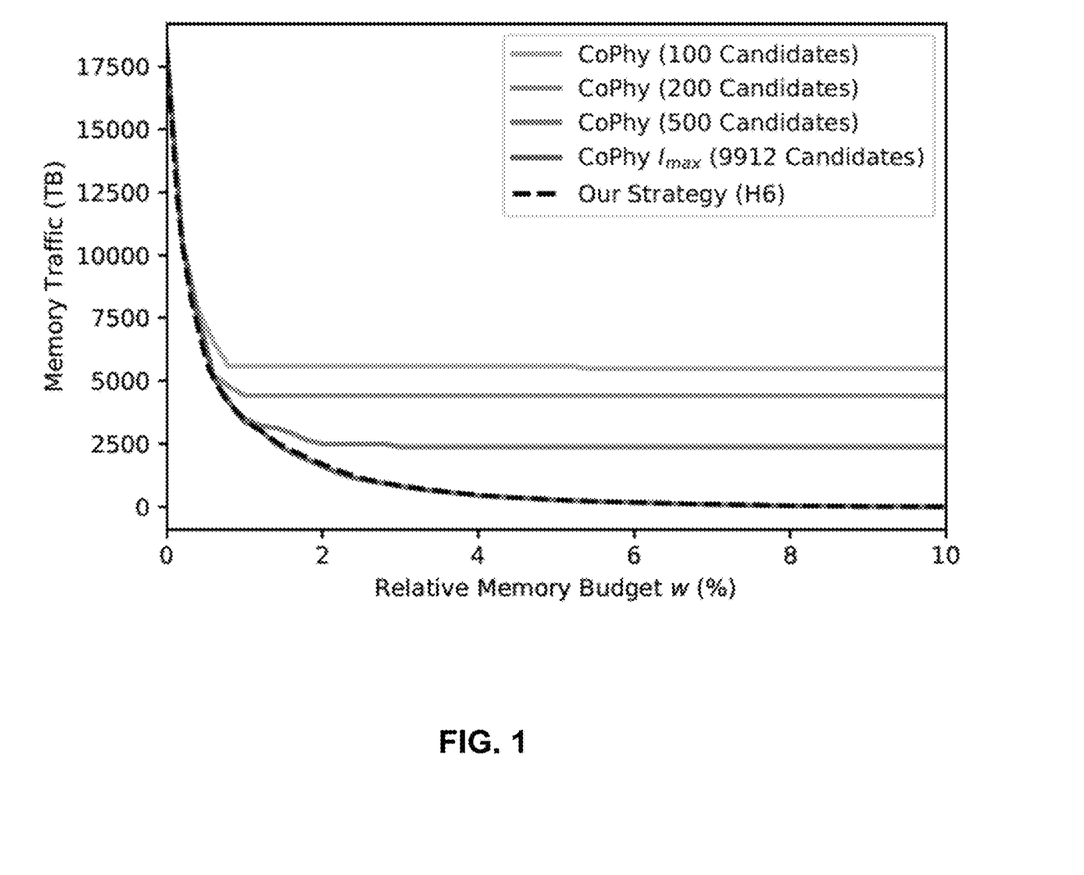
FIG. 1 shows an ERP system example: Comparison of combinations of scan performance and associated memory budgets (expressed as the share w of memory to store all single-attribute indexes) for the inventive strategy (H6) and CoPhy's concept with different sets of index candidates; N=4204 attributes, Q=2271 queries.

FIG. 1 shows the cost (calculated memory traffic) to process the aforementioned workload for varying memory budgets for the inventors' index selection strategy (denoted by (H6)) and CoPhy's selection approach [Dash et al. 2011]. In addition, the size of CoPhy's candidate sets is varied. The runtime of the inventors' approach amounts to approximately half a second whereas CoPhy needs several minutes in case all possible candidates (in this example 9 912) are used. The inventive approach clearly outperforms CoPhy's LP-based approach with limited candidate sets regarding the solution quality. If CoPhy's candidate set is not limited, the performance is on par with the inventive approach.

DETAILED DESCRIPTION

In the following, the embodiments are described and compared to other approaches.

A. Problem and Model Description

We consider a system with N attributes. The problem is to choose secondary indexes for a workload, consisting of Q queries, such that the overall performance is maximized, e.g., by minimizing the execution time, I/O traffic, or the amount of transferred memory. Each of the Q queries is characterized by a set of attributes $$q_j \subseteq \{1 \ldots N\}, j=1 \ldots Q,$$

that are accessed during query evaluation. A notation table is given in the following:

| | | Notation Table |
|---|---|---|
| Workload Parameters | N | number of attributes |
| | Q | number of queries |
| | T | number of tables |
| | n | number of rows of all attributes of a table |
| | $d_i$ | number of distinct values in attribute i |
| | $a_i$ | value size of attribute i, i = 1, . . . , N |
| | $s_i$ | selectivity of attribute i, i = 1, . . . , N |
| | $q_j$ | attributes accessed by query j, j = 1, . . . , Q, subset of {1, . . . , N} e.g., $q_1$ = {8, 6, 13, 14} |
| | $b_j$ | frequency of query j, j = 1, . . . , Q |
| | $g_i$ | number of occurrences of attribute i |
| | $\bar{q}$ | average number of attributes accessed by queries |
| | $\bar{I}_q$ | average number of index candidates applicable to a query |
| Cost Parameters | A | main memory budget |
| | w | relative main memory budget |
| | $f_j(0)$ | cost of scanning query j without an index |
| | $f_j(k)$ | cost of scanning query j with index k |
| | $p_k$ | memory size of index k, k ∈ I |
| Variables | I | set of multi-attribute index candidates |
| | $x_k$ | multi-attribute index k selected, yes (1)/no (0) |
| | $\underline{x}$ | vector of decisions of all $x_k$ for k ∈ I |
| | I* | set of selected indexes out of candidates I |
| | $f_j(I^*)$ | costs of query j for selection I* |
| | F(I*) | total costs of index selection I* |
| | P(I*) | occupied memory of index selection I* |
| | $\tilde{I}^*$ | existing: set of selected indexes (current state) |
| | R(I*, $\tilde{I}^*$) | index reconfiguration costs from $\tilde{I}^*$ to I* |
| | $I_j$ | set of candidates out of I applicable to query j |
| | $z_{jk}$ | decision variable: index k used for query j yes (1)/no (0), j = 1, . . . , Q, k ∈ $I_j$ |

A (multi-attribute) index k with K attributes is characterized by an ordered set of attributes $$k=\{i_1, \ldots i_k\}, \text{ where } i_u \in \{1 \ldots N\}, u=1 \ldots K.$$

Further, to describe index candidates, we use a set of indexes denoted by I, $$I \stackrel{e.g.}{:=} \{\{16, 3\}, \{1, 6, 2\}, \{5, 6\}\}$$

By the subset $$I^* \subseteq I,$$

we denote an index selection. Without loss of generality, using binary variables xx, we indicate whether a candidate index $k \in I$ is part of the selection $I^*$, i.e., $$I^*(I, \vec{x}) := \bigcup_{k \in I: x_k = 1} \{k\}$$

The costs of a query $q_j$, $j=1, \ldots, Q$, are denoted by values $f_j(I^*)$, which depend on the selection $I^*$. Usually $f_j(I^*)$ is determined by what-if optimizer calls. The functions $f_j$ assign costs to sets of indexes (which includes one-dimensional sets). Note, a query $q_j$ can be of various type, such as a selection, join, insert, update, etc. or a combination of the above. The total workload costs F are defined by the sum of query costs $f_j$ of all queries $q_j$, multiplied by their number of occurrences denoted by $b_j$, $j=1, \ldots, Q$, $$F(I) := \sum_{j=1,\ldots,Q} b_j \cdot f_j(I) \qquad (1)$$

Further, we assume that the memory consumed by the selected indexes is not allowed to exceed a certain budget A. The necessary memory for a (multi-attribute) index k, $k \in I^*$, is denoted by $p_k$ and can be arbitrarily defined. The total memory used by $I^*$ amounts to $$P(I^*) := \sum_{k \in I^*} p_k \qquad (2)$$

Further, we allow for reconfiguration costs. By R ($\bar{I}$, I) we denote the costs (arbitrarily defined) for changing an existing index selection $\bar{I}$ to a new selection $I^*$ (i.e., create new indexes $I^* \setminus \bar{I}^*$ and delete unnecessary ones $\bar{I} \setminus I^*$). Finally, (given an arbitrary but fixed current index selection $\bar{I}^*$) the multi-attribute index selection problem can be generally defined by $$\underset{x_k \in \{0,1\}, k \in I}{\text{minimize}} \ F(I^*(I, \vec{x})) + R(I^*(I, \vec{x}), \bar{I}^*) \qquad (3)$$

$$\text{subject to } P(I^*(I, \vec{x})) \leq A \qquad (4)$$

Note, in problem (3)-(4) both the variables $\vec{x}$ and the index candidate set I are crucial and have to be optimized.

B. CoPhy's LP Approach

In this subsection, we consider an integer linear programming approach to solve index selection problems. The approach resembles the concept of CoPhy [D. Dash et al., "CoPhy: A scalable, portable, and interactive index advisor for large workloads," PVLDB, vol. 4, no. 6, pp. 362-372, 2011.]. For ease of simplicity, without loss of generality, we do not consider updates and reconfiguration costs. CoPhy's model assumes that for each query at most one index (per table) is applied and that scan costs are additive separable for different tables. Moreover, it is assumed that the scan costs of a query when using a specific index are not affected by the presence of other indexes. Hence, if index k is applied to query $q_j$, CoPhy uses scan costs $$f_j(k), k \in I \cup 0,$$

where 0 describes the option that no index is applied to $q_j$. Further, by $$I_j \subseteq I$$

we denote the set of index candidates out of I that are applicable to query $q_j$, $j=1, \ldots, Q$. Without loss of generality, we assume that queries operate only on one table. For a given candidate set I, the essence of CoPhy's index selection LP approach can be written as:

$$\begin{aligned}
& \text{minimize} && \sum_{j=1,\ldots,Q, k \in I_j \cup 0} b_j \cdot f_j(k) \cdot z_{jk} && (5) \\
& z_{jk}, x_i \in \{0,1\}, i \in I, \\
& j = 1, \ldots, Q, k \in I_j \cup 0 \\
& \text{subject to} && \sum_{k \in I_j \cup 0} z_{jk} = 1 \ \forall \ j = 1, \ldots, Q && (6) \\
& && z_{jk} \leq x_k \ \forall \ j = 1, \ldots, Q, k \in I_j && (7) \\
& && \sum_{i \in I} p_i \cdot x_i \leq A && (8)
\end{aligned}$$

The family of constraints (6) guarantees that at most one index k is used for query qj. The constraints (7) serve to identify which indexes k are used at all. Finally, constraint (8) ensures that the memory budget A is not exceeded. CoPhy takes IIA into account as the LP allows for all index combinations $I^*$ out of I.

The complexity of the problem described by (5)-(8) is particularly characterized by the number of variables and constraints. Note, using $$I_j \subseteq I$$

instead of I allows to reduce the number of variables and constraints (from approx. Q*I, cf. variables $z_{jk}$ and constraint (7), respectively) to $$|I| + Q \cdot \bar{I}_q \text{ and } Q + Q \cdot \bar{I}_q + 1$$

where $$\bar{I}_q := 1/Q \cdot \Sigma_{j=1,\ldots,Q} |I_j|$$

is the average number of relevant index candidates per query.

If an index k is only applicable to a query $q_j$ under the condition that the first attribute of k denoted by l(k) is part of $q_j$, then the relevant sets $I_j$ can be defined as, $j=1, \ldots, Q$, $$I_j := \bigcup_{k \in I: q_j \cap l(k) \neq \emptyset} \{k\}$$

In this case, the number of variables and constraints can be approximated as follows. On average, we have |I|=N indexes that start with a specific attribute i, $i=1, \ldots, N$. Further, let $$\bar{q} := 1/Q \cdot \Sigma_{j=1,\ldots,Q} |q_j|$$

denote the average number of attributes occurring in queries. Hence, the average number of candidates applicable to a query is $$\bar{I}_q \approx \bar{q} \cdot |I|/N$$

Note, that the number of qualifying indexes can also be larger, as I typically contains indexes that start with attributes that overproportional occur in a workload's queries. Finally, the number of variables and constraints is approximately $$Q \cdot \bar{I}_q \approx Q \cdot \bar{q} \cdot |I|/N \qquad (9)$$

Hence, as expected, the problem complexity strongly increases in the number of queries Q and the number of candidate indexes |I|. As the linear programming formulations, cf. (5)-(8), require all cost coefficients $f_j(k)$, the number of what-if optimizer calls can also be estimated by $Q*\bar{I}_q$, cf. (9). Note, that what-if cost estimations can be efficiently and accurately derived, e.g., via INUM [S. Papadomanolakis, D. Dash, and A. Ailamaki, "Efficient use of the query optimizer for automated database design," in Proc. VLDB, 2007, pp. 1093-1104].

C. Preferred Index Selection Approach According to an Embodiment

In the following, we define the inventors' approach for multi-attribute index selection. Many index selection concepts are characterized by a two-step approach of (i) defining a well-sized index candidate set and (ii) deriving an optimized selection for a fixed memory budget (using heuristics or linear programming techniques).

Instead of these two steps, the disclosure proposes a constructive approach to compute index selections which is based on a recursive solution with increasing budgets. The disclosure proposes a workload-driven index selection approach that builds on an iterative mechanism and effectively accounts for IIA. The key idea is to prune index candidates as late as possible and to construct index selections in an iterative way. The power of recursion allows (i) to deal with the enormous size of index combinations and (ii) to incorporate index interaction in each construction step.

Further, in each step, new indexes are chosen or existing ones extended to consistently maximize the additional performance per additional memory. This technique has advantages compared to randomized shuffling or substitution heuristics used by existing approaches. The inventive approach also allows to include reconfiguration (index creation and deletion) costs.

One aspect of the disclosure therefore relates to a method for determining an index set/for the purpose of allowing running queries more efficiently against a database, e.g. with a shorter response time and/or less computing resources, the method being implemented in a computer system with a physical processing unit and a physical storage device, the computer storing the database with N attributes in the physical storage device.

According to a preferred embodiment, the method comprises the following steps:

(1) setting the working index set I=∅;
(2) determining a single-attribute index {i} (i=1, . . . , N) that minimizes the ratio between associated costs reduction and associated additional memory consumption;
(3) adding the determined single-attribute index to the working index set I;
(4) for each elementary index element {i} (i=1, . . . , N) and for each index k∈I,
  (a) creating a new index set $\bar{I}$ by adding {i} as new single-attribute index to the working index set I if I∩{i}=∅; and
  (b) creating a new index set $\bar{I}$ by appending {i} at the end of index k of the working index set I;
(5) from the new index sets I created in step (4), selecting the new set $\bar{I}^*$ that has the best ratio between associated costs reduction and associated additional memory consumption; and
(6) setting the working index set I=$\bar{I}^*$;
(7) repeating steps (4)-(6) until a predetermined condition is reached.

Figure 2:
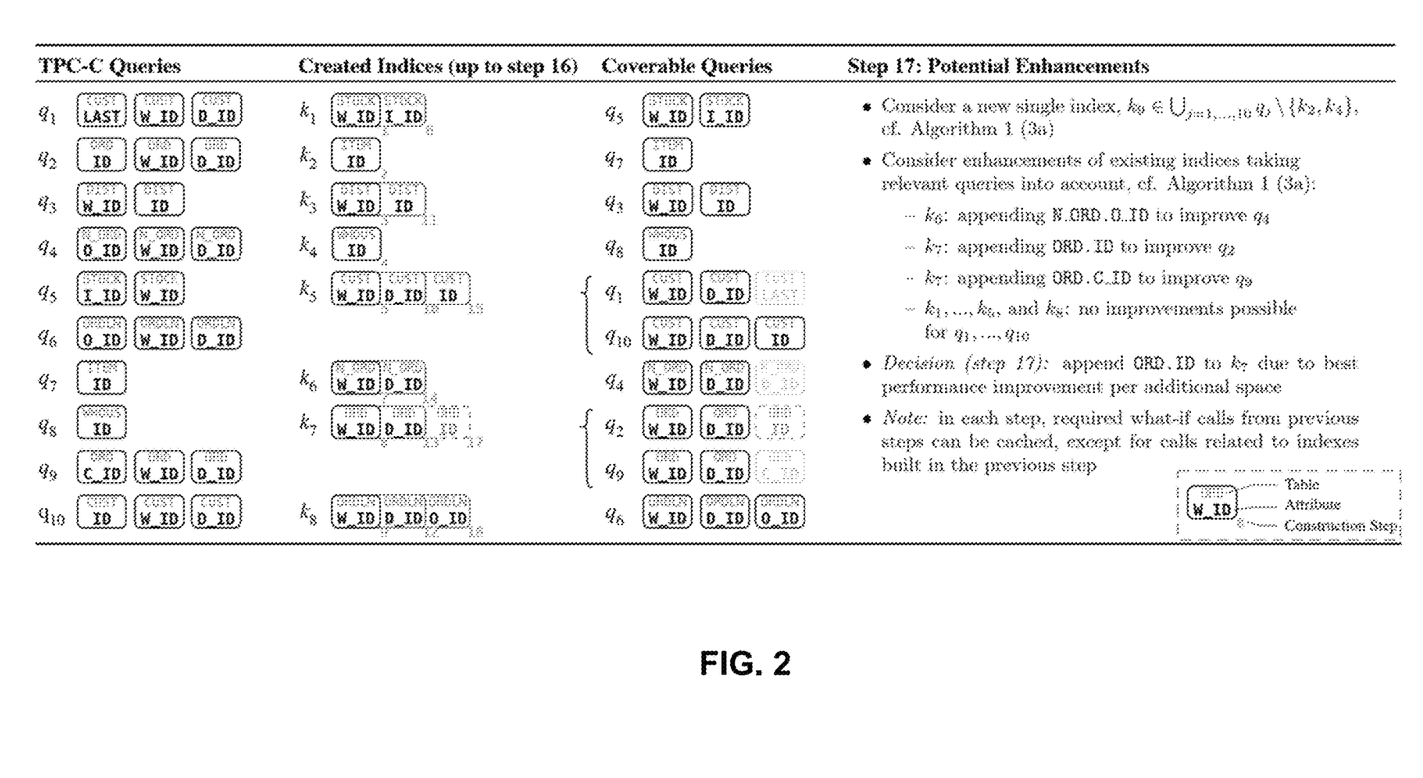
FIG. 2 shows an illustration of the inventive method for index selection for TPC-C: construction steps, applicability of indexes to different queries, and consideration of relevant index enhancements.

This method recursively adds attributes to a set of indexes. Attributes can either extend the current set of indexes I as a new single-attribute index or they can be appended to the "end" of existing indexes out of I (cf. morphing). The decision which attribute is added in which way is determined by comparing the additional performance, e.g. F(I)+R(I), to the associated additional utilized memory, cf. P(I), see (2). FIG. 2 illustrates the procedure for a TPC-C example 1. In a nutshell, the approach seeks to approximate the efficient frontier (regarding performance and size) associated to the multi-attribute index selection problem.

According to a preferred embodiment, the predetermined condition is that either memory consumption exceeds a memory budget or a predefined maximum number of construction steps is reached or no further improvement can be achieved.

According to a preferred embodiment, the associated costs include workload costs and preferably also reconfiguration costs of changing a current index set $\tilde{I}$ to a working index set I are defined by function R($\tilde{I}$,I).

According to a preferred embodiment, the workload costs are defined by the function F(I), the reconfiguration costs of changing a current index set $\tilde{I}$ to a working index set I are defined by function R($\tilde{I}$,I), and the memory consumption is defined by function P(I).

According to an embodiment, the database currently uses no index set.

According to a preferred embodiment, the database currently uses current index set $\tilde{I}$.

According to a preferred embodiment, the ratio according to step (2) is determined according to $$\frac{F(\emptyset) + R(\emptyset \tilde{I}) - F(\{i\}) - R(\{i\}, \tilde{I})}{P\{i\}}$$

and wherein the ratio according to step (5) is determined according to $$\frac{F(I) + R(I, \tilde{I}) - F(\bar{I}) + R(\bar{I}, \tilde{I})}{P(\bar{I}) - P(I)}.$$

According to a preferred embodiment, step (5) involves calculating the associated costs, and the step of calculating the associated costs involves caching intermediary results for the purpose of using them in subsequent runs of step (5). This is a time-saving optimization. If the elementary enhancements i=1, . . . , N are considered for indexes k∈I it is not necessary to fully recalculate costs F($\bar{I}$) using the what-if optimizer. It is sufficient to only recalculate costs for queries that might be affected by the potential attachment, cf. Step (4a or 4b). The costs of most queries do not change.

According to a preferred embodiment, the method is applicable independent of specific values of F, R, P, and f. The method can be generally applied and is independent of particular cost models or optimizers. The only requirements are that query costs need to be quantified and relative performance improvements of index attachments must be comparable, cf. steps (4)-(5). Note that the set of index candidates is not restricted in advance. There is also no maximum number of attributes used in a multi-attribute index. The method provides a series of construction steps, which recursively and thus efficiently determine growing sets of indexes I and their associated memory consumption P(I). The recursive selection allows to take cannibalization effects between different indexes into account as the value of an index candidate is measured by its additional performance improvement in the presence of other earlier selected indexes (cf. IIA).

There are further preferred and alternative embodiments:
1) The method can be accelerated, e.g., by just considering the n-best single-attribute indexes in the construction steps.
2) It is possible that indexes that have been built in earlier iterative steps are not used anymore as new indexes (requiring higher memory budgets) allow for more efficient scans. In such cases, the method can be optimized by excluding unnecessary indexes from the current index set.
3) To be able to identify different indexes that have the same leading attributes, the estimated impact of missed (e.g., second best) opportunities to extend indexes can be stored and potentially used in a later step. Note, the performance impact might have to be re-estimated.
4) In case what-if calls are inexpensive or sufficiently accurate cost models are present, the method can be generalized to consider not only single attributes but also certain pairs of attributes to build or extend indexes.

Another aspect of the disclosure relates to a computer system configured for carrying out the method for determining an index set I as described in relation to several embodiments above.

Another aspect of the disclosure relates to a computer program product comprising instructions which, when the program is executed by a computer, cause the computer to carry out the steps of the method as described in relation to several embodiments above.

D. Discussion of Different Selection Approaches

The index selection problem cannot be solved exhaustively as the number of combinations is enormous and the number of what-if calls that can be processed to estimate each cost improvement due to a specific index is limited. Hence, the set of index candidates to be considered has to be limited. As a limited candidate set can easily shrink the solution quality the index candidate set has to be (i) either very large or (ii) well defined. While (i) makes it difficult to find an optimal selection, it is also not easy to solve (ii), as it resembles the index selection problem itself.

Existing approaches work as follows: First, (large sets of) index candidates are chosen based on simple metrics (e.g., access frequency, selectivity, or size) and individually evaluated using what-if optimizer calls for all relevant queries. Second, for a given memory budget the final index selection is picked according to a certain mechanism. In [S. Chaudhuri and V. R. Narasayya, "An efficient cost-driven index selection tool for Microsoft SQL Server," in Proc. VLDB, 1997, pp. 146-155], final indexes are selected greedily based on their individually measured performance. While this procedure scales, IIA is not explicitly considered. Selected indexes are likely to cannibalize their impact.

CoPhy's linear programming approach allows identifying optimal index selections while taking also IIA into account. However, due to the complexity of the LP, the applicability of the approach is limited to small sets of index candidates. In [G. Valentin, M. Zuliani, D. C. Zilio, G. M. Lohman, and A. Skelley, "DB2 Advisor: An optimizer smart enough to recommend its own indexes," in Proc. ICDE, 2000, pp. 101-110], indexes are initially picked greedily based on their individually measured performance/size ratio (starting solution). To account for IIA and to increase performance index elements are randomly substituted. Thereby, the approach is applicable to large candidate sets. However, as the starting solution is often far away from optimal and the shuffling is not targeted, it can take a long time to obtain optimized results, particularly, when candidate sets are large. On first sight, the inventive method appears similar to greedy approaches like [G. Valentin, M. Zuliani, D. C. Zilio, G. M. Lohman, and A. Skelley, "DB2 Advisor: An optimizer smart enough to recommend its own indexes," in Proc. ICDE, 2000, pp. 101-110]. However, the inventors' approach has crucial differences. We apply greedy selections in a recursive subsequent way such that IIA, i.e., the presence of other (earlier selected) indexes, is taken into account.

By comparing cost estimations, it can be determined for which queries a potential new index (when added to a current index set) would be applied, cf. (1), and hence, by how much the current total performance would be improved. In each iterative step of the inventive method, an index is chosen such that the "additional performance" per "additional required memory" is consistently optimized. Hence, in contrast to [G. Valentin, M. Zuliani, D. C. Zilio, G. M. Lohman, and A. Skelley, "DB2 Advisor: An optimizer smart enough to recommend its own indexes," in Proc. ICDE, 2000, pp. 101-110], we address IIA in a targeted way.

The combinations and variety of indexes that can be composed by the inventive method are not restricted in advance (as when starting with certain sets of index candidates). Yet, the number of necessary what-if calls is comparably small as we also prune index candidates: Due to the use of recursive incremental index extensions/alterations, in each step, only small subsets of potential new indexes are considered and few what-if calls are performed.

Most importantly, the "direction" in which indexes are considered and selected follows the "additional performance per additional memory" criteria which reflects IIA. To sum up, the inventive approach (i) effectively includes IIA, (ii) performs a small number of what-if calls, and (iii) quickly identifies index selections for given budgets without using a solver-even for large problems.

E. Exemplary Implementation and Comparison to Alternative Approaches

In the following, example index selection heuristics and three heuristic rules as well as two index selection approaches resembling concepts used in [G. Valentin, M. Zuliani, D. C. Zilio, G. M. Lohman, and A. Skelley, "DB2 Advisor: An optimizer smart enough to recommend its own indexes," in Proc. ICDE, 2000, pp. 101-110] and [S. Chaudhuri and V. R. Narasayya, "An efficient cost-driven index selection tool for Microsoft SQL Server," in Proc. VLDB, 1997, pp. 146-155] are described:

Definition 1: The inventive approach and state-of-the-art concepts:
(H1): =Pick indexes of a given index candidate set/with the most used attributes, measured by the number of occurrences $$g_i = \Sigma_{j=1, \ldots, Q, i \in q_i} b_j, i=1, \ldots, N,$$

in queries as long as the given memory budget A is not exceeded.

(H2): =Pick indexes of a given index candidate set I with smallest selectivity $$s_i := 1/d_i, i = 1, \ldots, N,$$

as long as the budget A is not exceeded ($d_i$ the number of distinct values).

(H3): =Pick indexes of a given index candidate set I with the smallest ratio of selectivity and number of occurrences, i.e., $s_i = g_i$, $i=1, \ldots, N$, as long as A is not exceeded.

(H4): =Pick indexes of a given index candidate set I with the best performance as long as A is not exceeded; exclude candidates that are not efficient (concerning performance and size) for at least one query (skyline candidates), cf. [S. Chaudhuri and V. R. Narasayya, "An efficient cost-driven index selection tool for Microsoft SQL Server," in Proc. VLDB, 1997, pp. 146-155].

(H5): =Pick indexes of a given index candidate set I with the best performance per size ratio as long as A is not exceeded, cf. starting solution of [G. Valentin, M. Zuliani, D. C. Zilio, G. M. Lohman, and A. Skelley, "DB2 Advisor: An optimizer smart enough to recommend its own indexes," in Proc. ICDE, 2000, pp. 101-110].

(H6): =Apply the series of construction steps, cf. method according to the disclosure, as long as A is not exceeded.

Reproducible Evaluations

In this section, we use a reproducible scalable benchmark scenario to compare the runtime (Section 1) and the quality (Section 2) of the inventors' index selection approach, cf. Section C, to CoPhy's solution approach, cf. Section B.)

A comparison of all presented index selection concepts including (H4) and (H5), cf. Definition 1, for real-life workloads as well as end-to-end evaluations follows in Section 3.

(ii) In order to illustrate the applicability of the inventive approach in a reproducible setting, we fill the what-if optimizer calls for $f_j(k)$, $k \in I^* \cup 0$, according to an exemplary cost model described in Appendix Section B.

(iii) Further, we consider a (randomized) synthetic workload setting with T=10 tables. We consider different problem sizes with $Q_t$=50, ..., 5 000 queries and $N_t$=50 attributes per table, t=1, ..., T.

(iv) We compare the inventors' heuristic (H6), cf. the inventive method and Definition 1, to CoPhy's approach making use of the following three heuristics to define scalable sets of index candidates I:

(H1-M) For each m=1, ..., 4 select h index candidates of m attributes $\{i_1, \ldots, i_m\}$ that occur most frequently in queries throughout the workload $i_u=1 \ldots N$. $u=1 \ldots, m$, $\Sigma_{j=1 \ldots Q \cdot \{i_1, \ldots, i_m\} \in q_j} b_j$ (in desc. order).

(H2-M) For each m=1, ..., 4 select h index candidates of m attributes $\{i_1, \ldots, i_m\}$ that have the smallest combined selectivity $\Pi_{u=1, \ldots, m} s_{i_u}$ (in ascending order).

(H3-M) For each m=1, ..., 4 select h index candidates on tuples of m attributes with the best ratio of combined selectivity (cf. H2-M) and number of occurrences (cf. H1-M) in ascending order.

For M index candidates, let h:=M/4 for each m=1, ..., 4.

1. Applicability, Scalability, and Runtimes

We use Example 1 to compare the applicability of the inventive approach to CoPhy's solver-based approach.

For different problem sizes (characterized by the number of queries and attributes), Table I shows the runtimes (excluding what-if calls) of the inventors' strategy (H6)—implemented with a single-threaded C++ program—and CoPhy's approach (CPLEX 12.7.0.0, mipgap=0.05, 4 threads, via NEOS Solver) for different sizes of index candidate sets, cf. Example 1. ([3] DNF: Did not finish within eight hours.)

TABLE I

RUNTIME COMPARISON: SOLVING TIME OF OUR STRATEGY (H6) VS. COPHY'S APPROACH (WITH 5% OPTIMALITY GAP AND |I| INDEX CANDIDATES) FOR DIFFERENT PROBLEM SIZES WITH $IC_{max}$ POTENTIAL INDEXES, T = 10 TABLES, $\Sigma_t N_t$ = 500 ATTRIBUTES, BUDGET w = 0.2; WITHOUT TIME FOR WHAT-IF CALLS; EXAMPLE 1.

| # Queries $\Sigma_t Q_t$ | $IC_{max}$ $|I_{max}|$ | # Candidates $|I|$ | Ø Runtime CoPhy[3] | Ø Runtime (H6) |
|---|---|---|---|---|
| 500 | 4 249 | (100, 1K, $IC_{max}$) | (035, 4.1 19.7) s | 0.276 s |
| 1 000 | 7 504 | (100, 1K, $IC_{max}$) | (0.62, 7.3 59.0) s | 0.362 s |
| 2 000 | 13 862 | (100, 1K, 10 000) | (2.4, 470, DNF) s | 0.587 s |
| 5 000 | 29 111 | (100, 1K, 10 000) | (5.4, DNF, DNF) s | 1.121 s |
| 10 000 | 54 622 | (100, 1K, 10 000) | (6.1, DNF, DNF) s | 2.163 s |
| 20 000 | 97 550 | (100, 1K, 10 000) | (15.3, DNF, DNF) s | 5.552 s |
| 50 000 | 194 065 | (100, 1K, 10 000) | (16.3, DNF, DNF) s | 12.230 s |

Example 1. (Illustrating Reproducible Scalable Example)

In order to compare the inventive approach to CoPhy's solution, we consider the following setting.

(i) CoPhy applies at most one index per query. To obtain comparable results, we express query costs in the simplified "one index only" setting, i.e., given a selection I* the costs of a query j are determined by:

$$f_j(I^*) := \min_{k \in I^* \cup 0} f_j(k) = \min\left(f_j(0), \min_{k \in I^*} f_j(k)\right)$$

The number of selected indexes is roughly $|I^*| \approx u' \cdot \Sigma_t N_t = 100$. The budget A(w) is defined by the share w of the total memory required for all single-attribute indexes, $0 \le w \le 1$, $$A(w) := w \cdot \Sigma_{k \in \{\{1\}, \ldots, \{N\}\}} p_k \quad (10)$$

The runtimes of (H6) were again collected on a consumer notebook with an Intel Core i5 and 16 GB of main memory. The inventors observe that even for really large problem instances computations take only seconds and thus allow for basically immediate response times. To further accelerate the runtime of the inventors' strategy, the inventive method could be parallelized.

The inventors observe, that CoPhy's computation time significantly increases with the number of queries Q as well as the number of index candidates. The generation of candidate sets and calls to the what-if optimizer are not included. Note, the basic LP model, cf. (5)-(8), with Q=500 queries and |I|=1000 candidates typically has already more than 100 000 variables and 100 000 constraints.

Further, the number of combinations of indexes exponentially grows with the number of candidates (cf. [15]). Although solvers use pruning, they cannot circumvent that problem. Hence, for large problems the applicability of solver-based approaches is limited and, thus, the number of candidates has to be reduced to a small subset of potential indexes. Thereby, even though, the final selection of indexes is optimal (for the subset of index candidates), in general, the solution quality can be far from optimal.

Comparing the runtimes in Table I, the inventors observe that their approach is still applicable if problems are large. The complexity of their method is different: Due to the recursive nature of their approach, in each construction step, there is just a small number of possibilities which have to be evaluated. As current index selections remain, the number of possibilities in each step does not multiply—they just add up, leading to a dramatically lower complexity.

Moreover, the inventors' recursive approach does not require a particularly large number of cost estimations, e.g., what-if optimizer calls. Although in principle, a large number of index candidates can be constructed, not all of them are evaluated using what-if optimizer calls. The majority (e.g., often more than 50%) of optimizer calls occurs in the very first construction step, in which the scan costs of all potential single-attribute indexes $k=\{i\}$, $i=1, \ldots, N$, have to be determined for all queries $q_j$, $j=1, \ldots, Q$, i.e., the inventors roughly have q · Q what-if optimizer calls in the first step. In each of the following construction steps of the inventive method, only those queries have to be evaluated that could fully use a new potential (incrementally extended) multi-attribute index—otherwise the costs of a query do not change and have already been determined previously. Thus, in each construction step, just a small number of what-if calls has to be performed. Note, these numbers again just add up over all construction steps.

Whereas in the inventive approach the number of what-if calls ($\approx 2 \cdot Q \cdot \bar{q}$) slowly increases with the number of necessary construction steps to reach the targeted memory budget, in CoPhy's approach the number of calls ($\approx Q \cdot \bar{q} \cdot |I|/N$, cf. (9)) is roughly linearly increasing in the number of index candidates |I|. Thus, the inventive approach requires fewer cost estimations compared to CoPhy, especially if the number of candidates |I| is large compared to the number of columns N.

Moreover, if multiple indexes per query are admissible the complexity of the index selection problem is further increased as the costs of a query cannot separately be derived for different indexes, cf. Example 1 (i). Instead, the costs of a query are context-based, i.e., they may depend on the entire selection I*. Hence, Cophy's framework would have to be extended such that cost parameters $f_j(I)$ are available for all subsets I*. In addition, the LP (5)-(8) is very likely to become nonlinear, and hence, might be hardly applicable anymore.

The inventive method is applicable in settings with multiple indexes per query. In each step, what-if calls are made to evaluate potential extension where the current state, i.e., the current selection I, is taken into account. The only difference to the "one index only setting" is that some what-if calls performed in earlier steps have to be refreshed as the underlying current state (and in turn, query costs) might have changed.

2. Performance Comparison with CoPhy

Next, we compare the performance of CoPhy's approach with the inventors' strategy. To study to which extent CoPhy's performance depends on the size and quality of index candidate sets, we consider Example 1 for different parameters h, the number of index candidates.

Figure 3:
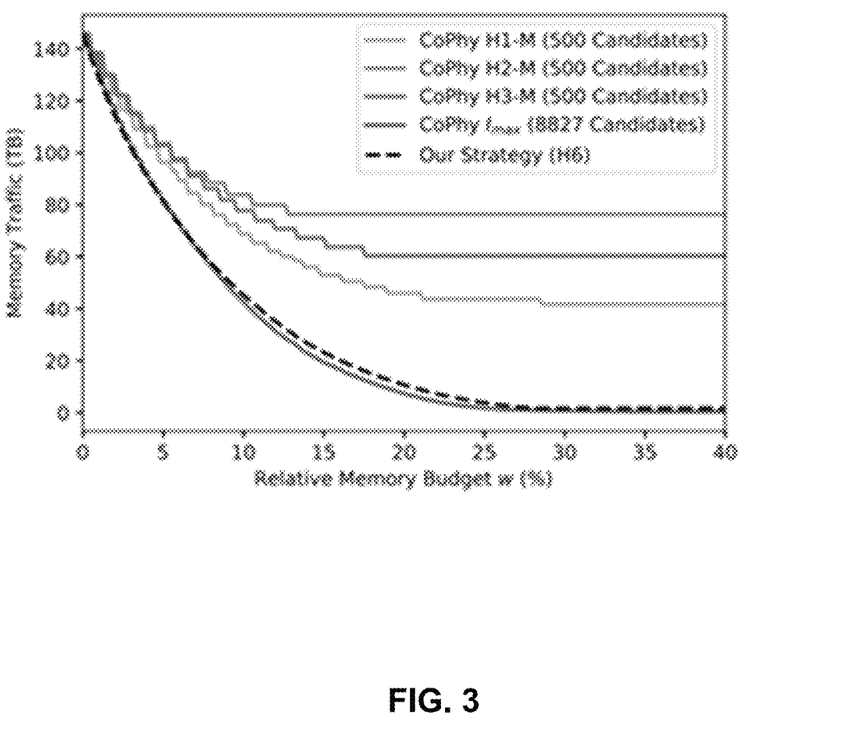
FIG. 3 shows a comparison of combinations of scan performance and associated relative memory budgets A(w), w∈[0, 0.4], for the inventive strategy (H6) and CoPhy's concept with different sets of index candidates using (H1-M), (H2-M), (H3-M) with |I|=500 and all candidates $I_{max}$; N=500, Q=1 000; Example 1.

FIG. 3 illustrates combinations of performance and memory used for the inventors' and CoPhy's selection approach in case different heuristics are used to define index candidate sets. The inventors observe that CoPhy's results are affected by the assortment of candidate sets. Depending on the targeted memory budgets, heuristics can perform differently. The inventors' strategy, however, provides excellent results for any budget.

Figure 4:
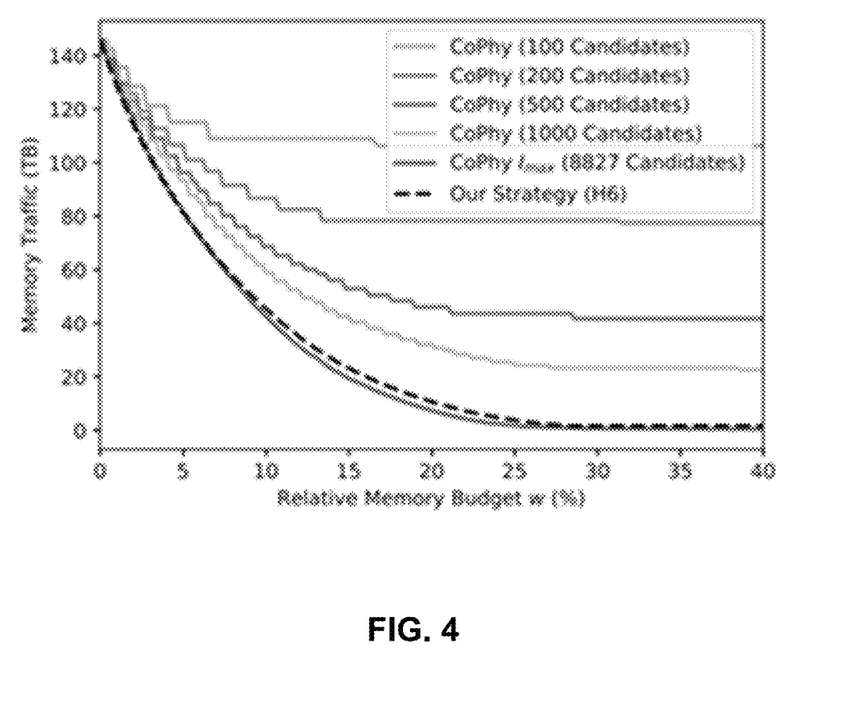
FIG. 4 shows a comparison of combinations of scan performance and associated relative memory budgets, cf. A(w), for the inventive strategy (H6) and CoPhy's concept with different sets of index candidates using (H1-M) and |I|=100, 1000, $|I_{max}|$ candidates, w∈[0, 0.4], N=500, Q=1000; Example 1.

FIG. 4 depicts the corresponding results in case CoPhy's selection approach uses different sizes of candidate sets according to (H1-M). As expected, CoPhy's results are significantly affected by the size of candidate sets. The smaller the set of candidates is, the higher is the chance that important indexes are missing. The larger the set of candidates, the higher the solve time becomes.

CoPhy's solutions are optimal in case the maximum number of potential indexes (cf. $I_{max}$) is used as an exhaustive candidate set. The fact that the inventors' strategy (H6) performs close to optimal verifies the high quality of the inventors' solution. Recall, in terms of computation times, the inventors clearly outperform solver-based approaches with large candidate sets which are necessary for solutions of high quality.

Finally, the inventors' solution can be used to replace as well as to improve traditional index selection approaches by complementing index candidate sets. If the indexes that the inventors' approach selects are used as additional index candidates, the problem complexity of solver-based approaches hardly increases while the solution quality may only improve.

3. Enterprise Workloads and End-to-End Evaluations

In Section 3.a, we present benchmark results which are based on data and workloads from a productive enterprise system of a Fortune Global 500 company. In 3.b, we demonstrate that the inventors' solution's quality does not depend on the exemplary cost model used in Section A-D. The inventors evaluate their approach with actual runtime costs measured with a commercial DBMS against all presented concepts including (H4) and (H5), cf. Definition 1.

a. Application to Enterprise Workloads

The inventors evaluate their strategy for a real-world enterprise system. They extracted the largest 500 tables (by memory consumption) from the database system including the queries accessing these tables. These 500 tables consist of 4 204 relevant attributes. The tables had between ~350 000 and ~1:5 billion rows. 55 758 distinct queries (with Q=2 271 query templates) were executed and more than 50 million query executions took place during the recorded period. The workload can be characterized as mostly transactional with a majority of point-access queries but also contains few analytical queries.

Figure 5:
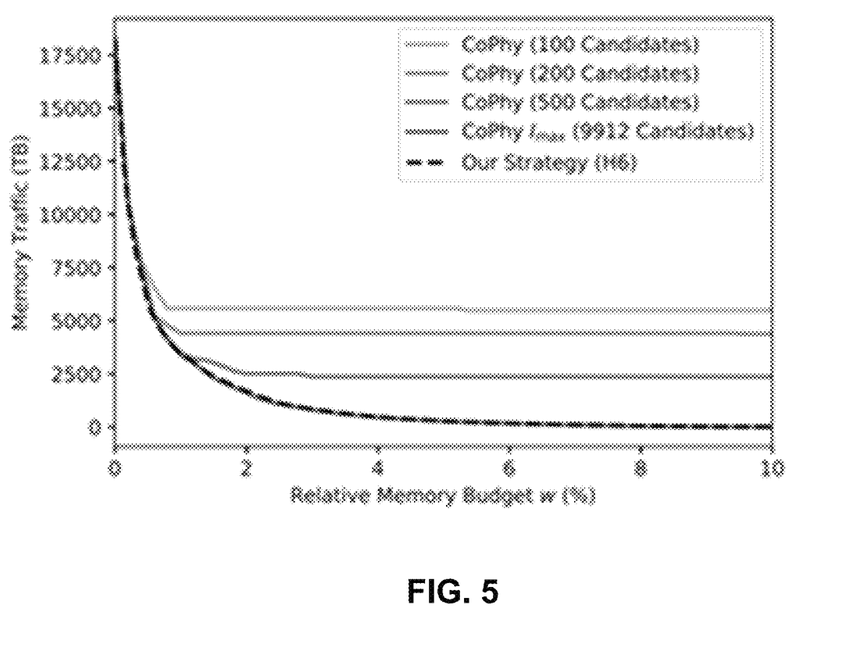
FIG. 5 shows an ERP systems example: Comparison of combinations of scan performance and associated relative memory budgets, cf. A(w), w∈[0, 0.1], for the inventive strategy (H6) and CoPhy's concept with different index candidates using (H1-M) and [I]=100, 1000, $|I_{max}|$; N=4204, Q=2271.

FIG. 5 shows the cost (calculated memory traffic) to process the aforementioned workload for varying memory budgets for the inventor's index selection strategy (H6) and CoPhy. In addition, the size of CoPhy's candidate sets is varied using (H1-M). The measurements reassure the results from Section E.1 and Section E.2 The inventive approach clearly outperforms CoPhy's LP-based approach with limited candidate sets regarding the solution quality. The runtime of the inventive approach amounts to approximately half a second whereas CoPhy with all 9 912 candidates needs several minutes.

The bad performance of the heuristics can be explained by the nature of real-world workloads. The aforementioned interaction between indexes plays an important role. Some attributes are often accessed together. Hence, an index on an attribute might degrade the performance of a potential index on another attribute. Rule-based heuristics like (H1)-(H3) cannot take these effects into account.

b. Evaluation with a Commercial DBMS

In this section the applicability of the inventors' solution is demonstrated in practice for real-world database systems. In addition, it is shown that the inventive approach is independent of exact cost modeling or what-if optimization implementations.

The following performance evaluations are conducted using a commercial columnar main memory database system. While the usage of (what-if optimizer-based) cost estimations is necessary to enable the solution of large problem instances, it has also been shown to be too often inaccurate. Hence, the inventors ran all evaluations without relying on what-if or other optimizer-based estimations but executed all queries one after another with the aforementioned database system. The actual reported execution time is then used to determine a query's cost for a given index configuration. To determine the impact of index candidates on query performance, the inventors also created all index candidates one after another and executed all queries for every candidate. These measured runtimes are then used (instead of what-if estimations) to feed the model's cost parameters. While this approach guarantees precise costs, it comes with a high evaluation time caused by evaluating every query for every index candidate multiple times. Therefore, the inventors used a scalable workload as in Example 1 instead of the real-world ERP workload to enable these experiments.

The measurements were conducted with the newest version of the DBMS on a machine with 512 GB of main memory and 64 cores with a clock speed of 2.3 GHZ. The inventors repeated the measurements at least 100 times per query per index configuration to reduce measurement inaccuracies. The workload is created by the above-presented workload generator which mimics real-life workload characteristics.

Based on the measured costs, the inventors compute index configurations using CoPhy, heuristics, and their recursive strategy.

Figure 6:
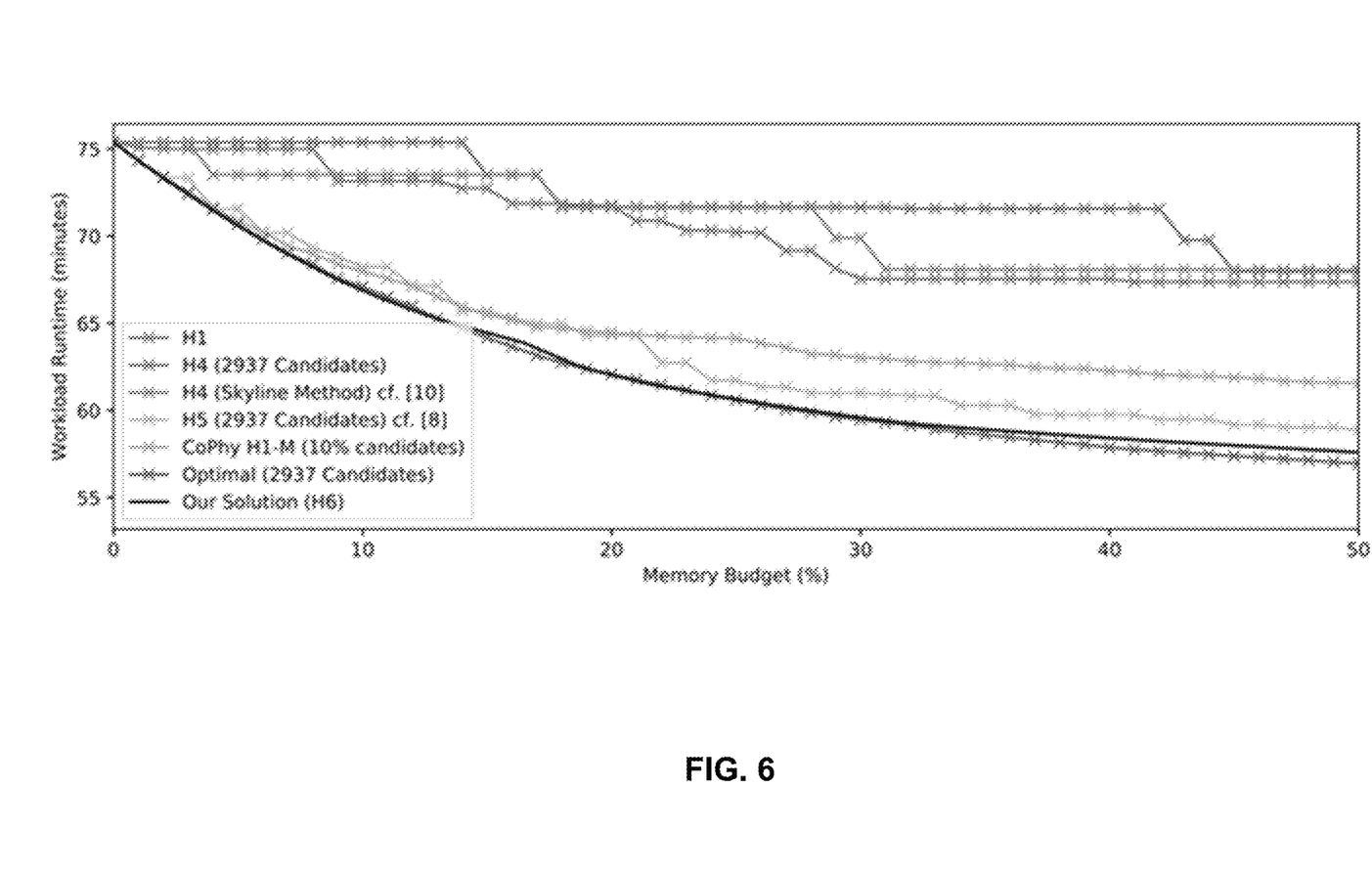
FIG. 6 shows an end-to-end evaluation: Combinations of workload runtime and associated relative memory budgets, cf. A(w), for the inventive strategy (H6) vs. frequency-based heuristic (H1), (H4) without the skyline method and all 2937 candidates, (H4) with the skyline method, (H5) with all candidates, and CoPhy's approach with 10% of the index candidates using the candidate heuristic (H1-M), and CoPhy with all candidates (optimal), w∈[0, 1], N=100, Q=100, $|I_{max}|$=2937. H2 and H3 as well as candidate set reductions via H2-M and H3-M are not presented due to their inferior performance.

FIG. 6 shows the performance of various index selection strategies. Up to a budget of roughly 30%, the inventors' solution is on par with the optimal solution CoPhy with all (2937) candidates. The performance of the inventors' solution is always within 3% of the optimal solution.

The results of (H1) and (H4) with and without dominated candidates (skyline method [Kimura et al. 2011]) based on the exhaustive candidate set are far away from optimal. Heuristic (H5) with the complete set of index candidates provides also good results. However, the results of (H5) are worse if the candidate set is too small (see FIG. 4) or of lower quality (which is the case when, e.g., using H2-M or H3-M to define candidate sets, see FIG. 3). Note, the results of CoPhy provide an upper performance bound if reduced candidate sets are used, since for a given candidate set CoPhy computes optimal selections. In this context, the results of CoPhy based on a 10% candidate selection (according to heuristic H1-M) show a significant performance decrease compared to CoPhy with all index candidates, cf. FIG. 6.

The results can be summarized as follows: First, the choice of the candidate set can significantly influence the overall performance. Second, for a fixed candidate set the final selection mechanism crucially affects overall performance. Third, the inventive approach does not depend on a suitable selection of candidates and provides near-optimal results.

Although the workload size of the inventors' example is relatively small, the problem complexity of CoPhy's LP is already surprisingly high. Both, the number of variables and constraints is linearly increasing with the size of the index candidate set (see FIG. 7). The problem complexity, i.e., the solving time, typically increases super-linearly with the number of variables as well as the number of constraints. The exhaustive set of 2937 index candidates leads to roughly 20000 variables and constraints. The solving time for such problems can already take several minutes (cf. Table I) depending on the solver used, the specified optimality gap, the available hardware, etc. To reduce the number of candidates, permutations of multi-attribute index candidates can be substituted by their presumably best representative. However, in general, results will be negatively affected by removing other permutations.

Further, if problem instances are large, performance-based approaches like (H4) and (H5) are also affected. As in their approaches cost predictions have to be available for all index candidates, the required number of what-if optimizer calls can be (too) large. Hence, reduced candidate sets have to be used, which requires suitable candidate heuristics and often leads to an overall performance decrease, cf. FIG. 6.

Finally, the inventors' results verify that their solution's results also hold in end-to-end scenarios: (i) the inventive approach outperforms simple rule-based selection strategies, (ii) the inventive approach outperforms CoPhy with restricted candidate sets, and (iii) the inventors verify that their results are close to optimal in case of tractable selection problems. Thereby, the inventors demonstrate that their solution finds close to optimal index configurations also when not relying on what-if estimations or specified cost models. Moreover, their solution is scalable as what-if optimizer-based costs are less frequently determined (see Section E.1) and no solver is required.

4. Discussion of Evaluation Results

The inventors compared their solution against conceptual heuristics used by [Valentin et al. 2000] (cf. (H5)), [Kimura et al. 2011] (cf. (H4)), and CoPhy's approach. Note, for [Valentin et al. 2000], its starting solution (H5) provides a lower bound while CoPhy yields an upper performance bound.

For reproducibility, in Section E.1 (scalability) and Section E.2 (performance), the inventors used an exemplary illustrating cost model, cf. Example 1. For the end-to-end evaluation in Section E.3.b, instead of a cost model, the inventors used what-if optimizer-based cost predictions, which include complex effects of modern execution engines.

The results show that the inventors' approach scales and quickly provides near-optimal index selections. The inventors' approach outperforms (H4) and (H5) as well as CoPhy's results if the set of candidates is small compared to the set of all potential candidates. Hence, the inventors' approach is a promising alternative to existing tools, particularly for large problems.

The scalability, i.e., the quick runtime, of the inventors' approach can be explained as follows: (i) during the recursive method, the inventors consider only a limited subset of index candidates, and (ii) instead of a randomized mechanism, they use a constructive deterministic one with a comparably small number of steps.

The performance of the inventors' approach can also be explained. Their approach exploits structures and properties that are typical for real-world workloads and the performance of indexes: First, an index A can be applied to more queries than an (extended) index AB and requires less memory (Property 1). Second, similar indexes AB and AC typically cannibalize each other, i.e., when both are selected together they can only marginally increase the overall workload performance compared to a scenario where just (the best) one of them is selected (Property 2). Third, it can be assumed that taking out any index from a Pareto-efficient selection significantly affects performance. Hence, from Property 2 follows that selections with several similar indexes are not efficient and that including an index has to significantly increase performance (Property 3). Fourth, the Pareto-efficient frontier of "performance" and "required memory" is of convex shape, cf. FIG. 3-6.

The inventive approach exploits those properties: If an index AB is beneficial, then typically index A also is, cf. Property 1, and hence, is identified (and extended) by their method. Their method does not construct similar indexes, cf. Property 2. The inventors' recursion only realizes index selections/extensions with significant additional performance per size ratio while taking IIA (of the current state) into account, cf. Property 3. With an increasing number of the inventive method's steps, the realized additional performance per size typically decreases (diminishing returns), cf. Property 1 and Property 4. Thus, it is very unlikely that their method misses a major improvement in a future step, and in turn, their approach resembles the efficient frontier of performance and required memory.

When Properties 1-4 are unsatisfied, the inventors' recursive approach has probably limitations. For instance, their approach might miss beneficial indexes in case they require a previous expensive but not directly beneficial index to append to. In this context, the inventors refer to the discussion of potential extensions of the inventive method. To study optimality gaps of special cases, the inventors recommend using CoPhy's solution as a reference. It will be challenging to derive performance guarantees as what-if optimizer-based costs lack functional structure.

The invention claimed is:

1. A method implemented in a computer system with a physical processing unit and a physical storage device, the method for executing queries by the physical processing unit on a database using an index set I, the computer system storing the database with N attributes in the physical storage device, wherein the index set I is a set of multi-attribute index candidates having an ordered set of attributes $k=\{i_1, \ldots, i_K\}$ where $i_u \in \{1, \ldots, N\}$, $u=1, \ldots, K$, the method comprising the following steps:

(1) setting, by the physical processing unit of the computer, the working index set $I=\emptyset$;

(2) determining, by the physical processing unit, a single-attribute index $\{i\}$ ($i=1, \ldots, N$) that minimizes the ratio between associated costs reduction of the processing performed by the physical processing unit and associated additional memory consumption of the physical storage device;

(3) adding, by the physical processing unit, the determined single-attribute index from step (2) to the working index set I;

(4) for each elementary index element $\{i\}$ ($i=1, \ldots, N$) and for each index $k \in I$, when $I \cap \{i\} = \emptyset$, (a) creating, by the physical processing unit, a new index set $\tilde{I}$ by adding $\{i\}$ as new single-attribute index to the working index set I; and when $I \cap \{i\} \neq \emptyset$, (b) creating, by the physical processing unit, a new index set $\tilde{I}$ by appending $\{i\}$ at the end of index k of the working index set I;

(5) from the new index sets $\tilde{I}$ created in step (4), selecting, by the physical processing unit, the new index set $\tilde{I}^*$ that has a best ratio between associated costs reduction of the processing performed by the physical processing unit and associated additional memory consumption of the physical storage device;

(6) setting, by the physical processing unit, the working index set $I=\tilde{I}^*$; and (7) executing, by the physical processing unit, a query using the working index set determined in step (6), wherein in the ratio according to step (2), the associated costs are based on workload costs and reconfiguration costs of changing a current index set to a working index set stored by the physical storage device, and the associated memory consumption is based on an occupied memory of the single-attribute index $\{i\}$, and wherein in the ratio according to step (5), the associated costs are based on workload costs and reconfiguration costs of changing a current index set to a working index set stored by the physical storage device, and the associated memory consumption is based on a difference between an occupied memory of the new index sets $\tilde{I}$ and an occupied memory of the working index set I.

2. The method of claim 1 further including the step:

(6.1) repeating steps (4)-(6) until a predetermined condition is reached.

3. The method of claim 2, wherein the predetermined condition is that either memory consumption exceeds a memory budget or a predefined maximum number of construction steps is reached or no further improvement can be achieved.

4. The method according to claim 1, wherein in the ratio according to step (5), the reconfiguration costs of changing the current index set $\bar{I}$ to the working index set I are defined by function R ($\bar{I}$, I).

5. The method according to claim 1, wherein the workload costs are defined by the function F(I), the reconfiguration costs of changing the current index set $\bar{I}$ to the working index set I are defined by function R ($\bar{I}$, I), and the memory consumption is defined by function P(I).

6. The method according to claim 1, wherein the database currently uses no index set.

7. The method according to claim 1, wherein the database currently uses current index set $\bar{I}$.

8. The method according to claim 1, wherein the ratio according to step (2) is determined according to $$\frac{F(\emptyset) + R(\emptyset \bar{I}) - F(\{i\}) - R(\{i\}\bar{I})}{P\{i\}}$$

and wherein the ratio according to step (5) is determined according to $$\frac{F(I) + R(I, \tilde{I}) - F(\tilde{I}) + R(\tilde{I}, \tilde{I})}{P(\tilde{I}) - P(I)}.$$

9. A computer system comprising a physical processing unit and a physical storage device, the computer system for executing queries by the physical processing unit on a database using an index set I, the computer system storing the database with N attributes in the physical storage device, wherein the index set I is a set of multi-attribute index candidates having an ordered set of attributes $k=\{i_1, \ldots, i_K\}$ where $i_u \in \{1, \ldots, N\}$, $u=1, \ldots, K$, the physical processing unit configured to control the computer system to execute processing including:
  (1) setting, by the physical processing unit of the computer, the working index set $I=\emptyset$;
  (2) determining, by the physical processing unit, a single-attribute index $\{i\}$ ($i=1, \ldots, N$) that minimizes the ratio between associated costs reduction of the processing performed by the physical processing unit and associated additional memory consumption of the physical storage device;
  (3) adding, by the physical processing unit, the determined single-attribute index from step (2) to the working index set I;
  (4) for each elementary index element $\{i\}$ ($i=1, \ldots, N$) and for each index $k \in I$,
    when $I \cap \{i\} = \emptyset$,
      (a) creating, by the physical processing unit, a new index set $\tilde{I}$ by adding $\{i\}$ as new single-attribute index to the working index set I; and
    when $I \cap \{i\} \neq \emptyset$,
      (b) creating, by the physical processing unit, a new index set $\tilde{I}$ by appending $\{i\}$ at the end of index k of the working index set I;
  (5) from the new index sets $\tilde{I}$ created in step (4), selecting, by the physical processing unit, the new index set $\tilde{I}^*$ that has a best ratio between associated costs reduction of the processing performed by the physical processing unit and associated additional memory consumption of the physical storage device;
  (6) setting, by the physical processing unit, the working index set $I=\tilde{I}^*$; and
  (7) executing, by the physical processing unit, a query using the working index set determined in step (6),
  wherein in the ratio according to step (2), the associated costs are based on workload costs and reconfiguration costs of changing a current index set to a working index set stored by the physical storage device, and the associated memory consumption is based on an occupied memory of the single-attribute index $\{i\}$, and
  wherein in the ratio according to step (5), the associated costs are based on workload costs and reconfiguration costs of changing a current index set to a working index set stored by the physical storage device, and the associated memory consumption is based on a difference between an occupied memory of the new index sets $\tilde{I}$ and an occupied memory of the working index set I.

10. A computer program product comprising instructions which, when the program is executed by a computer, cause the computer to carry out the steps of the method according to claim 1.

11. The method according to claim 1, wherein in the ratio according to step (2), the workload costs are a difference between a total cost of the working index set $I=\emptyset$ and a total cost of the single-attribute index $\{i\}$.

12. The method according to claim 1, wherein in the ratio according to step (5), the workload costs are a difference between a total cost of the working index set I and a total cost of the new index sets $\tilde{I}$.

13. The method according to claim 1, further comprising:
  (8) outputting, by the computer system, a result of the query executed in step (7).

14. The method according to claim 1, further comprising:
  (8) outputting, by the computer system, a result of the query executed in step (7), wherein the result corresponds to a subset of the database stored by the physical storage device.

15. The method according to claim 1, further comprising:
  (8) outputting, by the computer system, a result of the query executed in step (7), wherein the result corresponds to a subset of the database stored by the physical storage device as selected by executing the query using the working index set determined in step (6).

* * * * *